United States Patent [19]

Mak et al.

[11] Patent Number: 4,996,513
[45] Date of Patent: Feb. 26, 1991

[54] CARRIER STABILITY ERASURE FILLING SYSTEM FOR COMMUNICATIONS OVER ELECTRICITY DISTRIBUTION NETWORK

[75] Inventors: Sioe T. Mak; Richard L. Maginnis; Kevin J. Franzen, all of St. Louis County, Mo.

[73] Assignee: Emerson Electric Co., St. Louis, Mo.

[21] Appl. No.: 481,247

[22] Filed: Feb. 20, 1990

[51] Int. Cl.$^5$ .................. H04M 11/04; H04J 1/12
[52] U.S. Cl. .................. 340/310 R; 340/310 A; 358/138; 358/166; 375/36; 375/99; 375/104; 370/6
[58] Field of Search ........ 340/310 R, 310 CP, 310 A, 340/538; 375/36, 76, 99, 104; 370/6; 358/138, 166

[56] References Cited

U.S. PATENT DOCUMENTS 4,914,418 4/1990 Mak et al. .................. 340/310 A

Primary Examiner—Donnie L. Crosland
Attorney, Agent, or Firm—Polster, Polster and Lucchesi

[57] ABSTRACT

A communication system uses the current waveform of an electricity distribution network as a carrier, the signal being present as current pulses around four predetermined zero crossings. The current waveform is sampled around the voltage zero crossings to obtain a time-ordered set of waveform values. The ordered waveform values for each bit are examined to determine if the values fall within preset criteria indicative of a stable carrier. When the ordered waveform values for a particular bit all fall within the preset criteria, that particular bit is identified as a good bit. When at least some of the ordered waveform values for a particular bit fall outside the preset criteria, that particular bit is labelled as suspect. The ordered values of each suspect bit and of adjacent bits are tested to determine whether four successive values meets the preset stability criteria, and whether the four successive values indicating a stable carrier include at least two succesive values from the suspect bit. If the carrier stability test is passed, the binary value of the suspect bit is based upon the successive carrier stability indicating values from the suspect bit. Otherwise the suspect bit is labelled as uncorrectable.

20 Claims, 3 Drawing Sheets

CARRIER STABILITY ERASURE FILLING SYSTEM FOR COMMUNICATIONS OVER ELECTRICITY DISTRIBUTION NETWORK

BACKGROUND OF THE INVENTION

This invention relates to a system for extracting information from a carrier wave and relates generally to the method and apparatus described in U.S. Pat. Nos. 4,106,007 and 4,218,655, the disclosures of which are incorporated herein by reference. As described in those patents, it is known that a modulation voltage can be superimposed on a power system voltage, at specified locations on the power system voltage such as a zero crossing, to cause wave shape perturbations in the carrier wave. In the embodiment described hereinafter, the carrier wave is the current wave of an electrical power distribution network.

Communication over electric power distribution lines is useful for signaling, meter reading, and load control, among other uses. However, communication over an electric distribution network is a complex undertaking. Each customer service constitutes a branch in the distribution feeder, and the branching is so extensive that it is impractical to provide filter and by-pass circuitry at each branch point. The distribution network is not an attractive medium for conventional communications due to the attenuation and dispersion of the signals and because noise levels tend to be high. To overcome the high noise levels, it is generally necessary to use narrow band filtering, error-detecting and error-correcting codes, and relatively high signal power levels at low bit rates.

The aforementioned problems arise in two areas. The first concerns transmitting information from the central source in the direction of energy flow to the individual customer premises. This transmission of information in the direction of energy flow is referred to as "outbound" signaling. Functions such as automatic meter reading and various alarm systems, however, require that information passes not only from a single source to the end user, but also from the end user back to the central station. This transmission of information in the direction opposite to that of the energy flow is referred to herein as "inbound" signaling.

In the system described in the aforementioned patents, each binary digit (a binary "1" or a binary "0") is composite. It is made up of four current pulse modulations located at preselected zero crossings of the electrical distribution network voltage waveform. These four current pulses are located within eight zero crossings (four complete cycles) of the waveform. The current pulse patterns for "1"s and "0"s are complementary.

Of course, any particular pulse pattern for a 1 is not unique. By using different pulse patterns to define binary 1s and "0"s, it is possible to define a number of separate channels over which information can be transmitted in each eight half-cycle segment of the waveform. No matter what the channel, however, the pulse patterns for "1s" and "0s" are complementary.

It has been found, in studying inbound signals received over communications systems of the type described above, that pulse patterns are sometimes contaminated. As a result it is difficult at times to reconstruct the message originally sent, even with the relatively high signal levels and low bit rates of such systems.

To remedy the bit contamination problem, simple parity checking systems with error correction features have been tried, but they are not wholly satisfactory. Error correction in these cases has not always been completely accurate.

One example of the problem of bit contamination involves the bit detection scheme typically used in such systems. Heretofore, the detection scheme for such communications systems has generally involved summing the magnitudes of the current pulses detected. With such a scheme, a badly contaminated pulse can contaminate the entire bit even though the other pulses may not be contaminated.

SUMMARY OF THE INVENTION

Among the various objects and features of the present invention may be noted the provision of an improved method of detecting contaminated bits in an electricity distribution network communication system.

Another object is the provision of such a method with improved ability to correct a contaminated bit.

A further object is the provision of such a method which identifies and isolates uncorrectable bits.

A fourth object is the provision of such a method uses a measure of carrier stability as an aid in correcting contaminated bits.

Other objects and features of this invention will be in part apparent and in part pointed out hereafter.

Briefly, the method of the present invention is applied in a communication system using the current waveform of an electricity distribution network as a carrier and in which the signal is present as composite binary digits. Each composite binary digit is defined by a pulse pattern at preselected positions on the voltage waveform, the pulses being spaced along the waveform so that they are ordered in time. In such a system the pulse pattern for a binary "1" is complementary to the pulse pattern for a binary "0". The method is specifically designed to identify the binary digits and includes the step of sampling the current waveform at the preselected locations to obtain an ordered set of waveform values. The magnitudes of the sampled values corresponding to a binary digit pulse pattern are larger, in a noise-free system, when the binary digit corresponding to that pulse pattern is present than when it is absent.

The method also includes the step of examining the ordered waveform values for each bit to determine if the values fall within preset criteria indicative of a stable carrier. When the ordered waveform values for a particular bit all fall within the preset criteria, that particular bit is identified as having the binary value corresponding to its sampled pulse pattern. But when at least some of the ordered waveform values for a particular bit fall outside the preset criteria, that particular bit is labelled as suspect. For each suspect bit, the ordered values of that bit and of adjacent bits are tested to determine whether a series of a first predetermined number of successive values meets the preset stability criteria. The series must include at least a second predetermined number of successive values from the suspect bit and at least the second predetermined number of successive values from an adjacent bit. When the test of the testing step is met, the binary value, if any, of the suspect bit is identified based upon said second predetermined number of successive values from the suspect bit. Otherwise the suspect bit is labelled as uncorrectable.

BRIEF DESCRIPTION OF THE DRAWINGS

Similar reference characters indicate similar parts throughout the various views of the drawing.

DESCRIPTION OF THE PREFERRED EMBODIMENT

Figure 1:
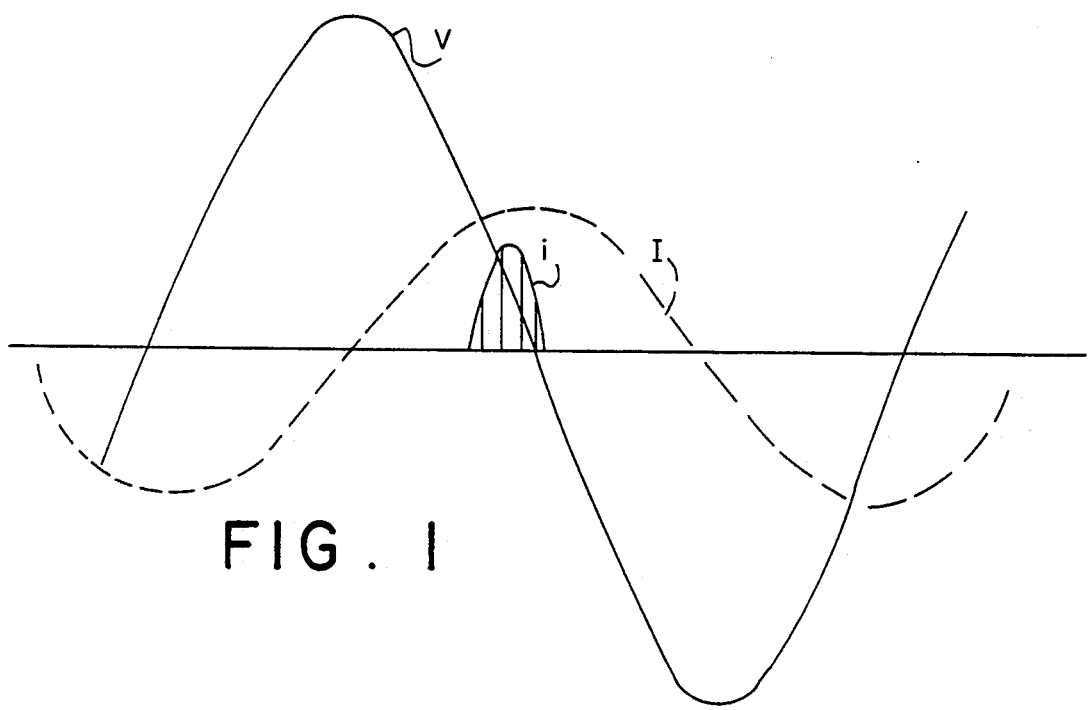
FIG. 1 is a graphical representation of a portion of the voltage and current waveforms of an electricity distribution network showing the placement of a current pulse injected at the zero crossing of the voltage waveform.

A suitable signaling method for inbound and outbound communication over an electric distribution system is illustrated in FIG. 1. In this method, a current pulse "i" is shown injected near the zero crossing of the voltage of the 60 Hz system. Of course, the signal current could be injected at another suitable location (i.e., another voltage level). In FIG. 1, and throughout the drawings, a capital letter indicates continuous voltages or currents, as appropriate, and small letters indicate pulses of short duration. The signal for the pulse labeled "i" is identical in sign and phase with the system current, labeled "I", but is of much shorter duration. Although only one signal pulse "i" is shown in FIG. 1, in practice it is desirable to inject pulses at a number of zero crossings (e.g., four zero crossings) to better enable the signal to stand out from the noise.

Figure 2:
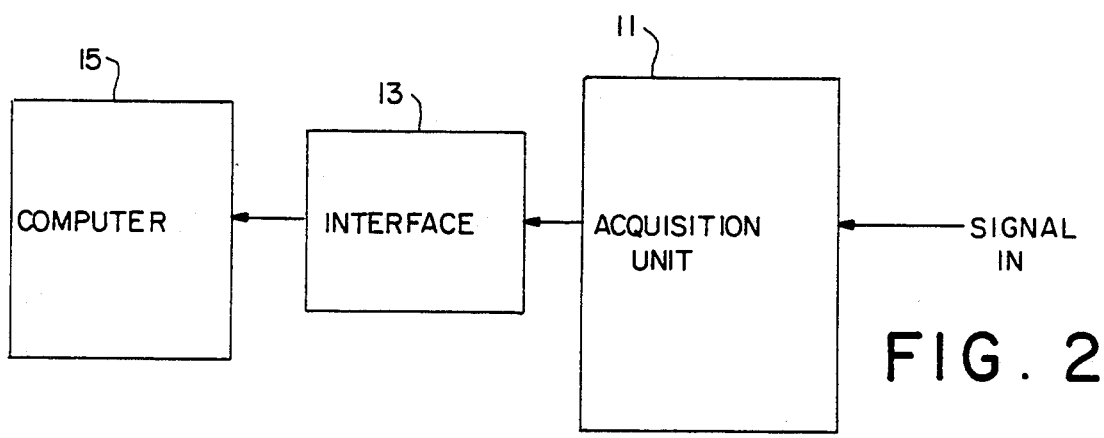
FIG. 2 is a block diagram illustrating typical apparatus for performing the method of the present invention.

The signal present in FIG. 1 is extracted by sampling the current waveform I of the electricity distribution network at the preselected locations (e.g., the zero crossings). This is illustrated in FIG. 2 by acquisition unit 11. Circuitry for sampling current waveforms is, of course, well known. The sampled values are supplied through a standard interface 13 to a computer 15. The particular interface needed is determined by the particular computer 15 being used.

Computer 15 is programmed by suitable software to perform the identification method or scheme of the present invention. In fact, one of the advantages of the present invention is that it requires no hardware in addition to that already present in communication systems which use the current waveform of the electricity distribution network as a carrier.

Figure 4:
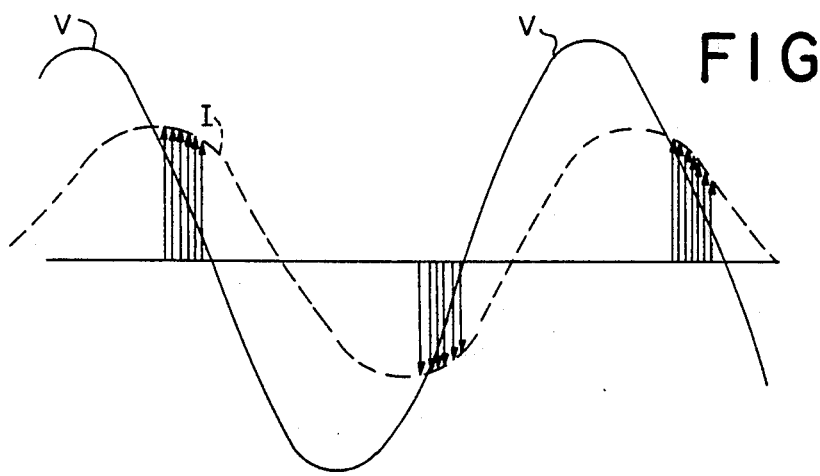
FIG. 4 is a graphical representation of the current waveform of FIG. 1 illustrating the placement and general magnitude of current samples taken by the apparatus of FIG. 2.
Figure 3:
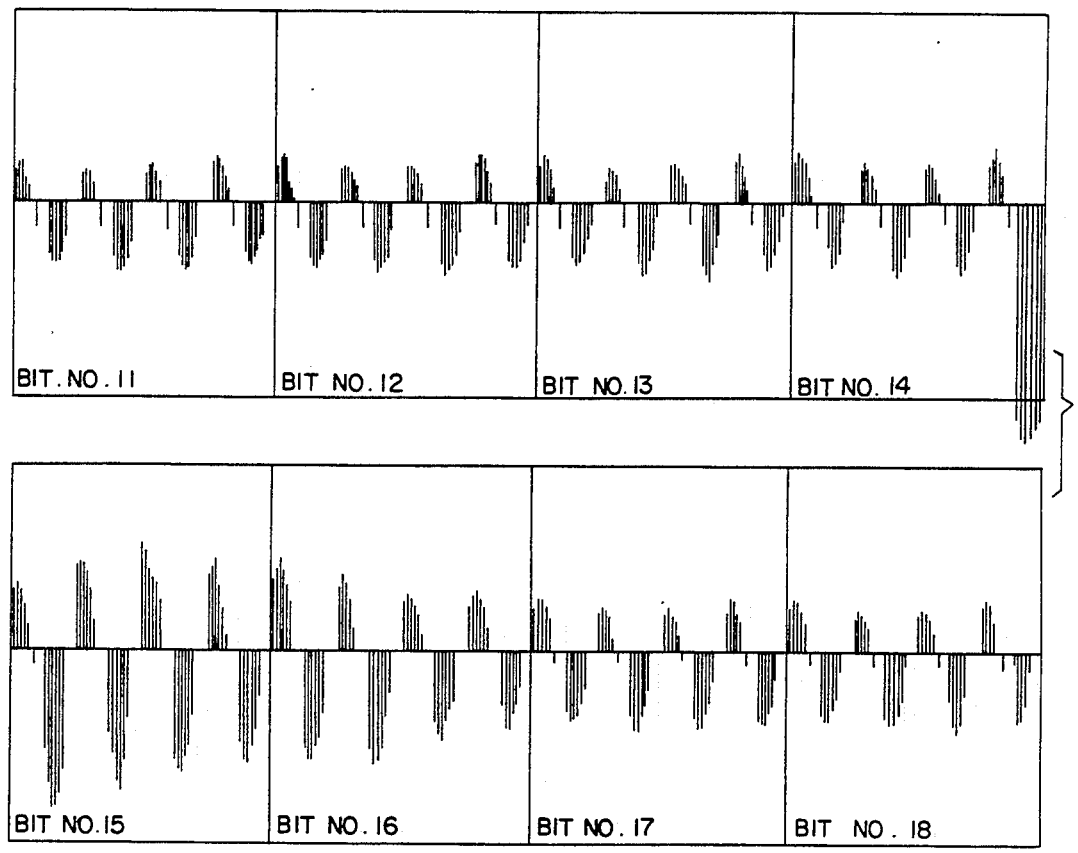
FIG. 3 is a plot representing current samples taken by the apparatus of FIG. 2, illustrating bit contamination.

Bit contamination can occasionally cause signals to be degraded in electricity distribution network communication systems beyond the ability of standard parity check/error correcting codes to correct. An example of bit contamination is illustrated in FIG. 3. This plot shows a display of data illustrating both uncontaminated and contaminated bits. FIG. 3 consists of eight frames corresponding to eight bits (bits 11-18) of a multibit message, arranged in time sequence, with the sampled waveform values plotted thereon. As can be seen, for each bit there are eight different locations on the waveform where sampling takes place. Three of these locations are illustrated in simplified form in FIG. 4. As can be seen, the samples are taken near the zero crossings of the voltage waveform, so the samples in FIG. 3 represent eight zero crossings of that waveform for each bit.

The individual samples themselves are made up of twelve sample points, clustered at the zero crossing of the voltage waveform. Because of the scale of FIG. 3, all twelve sample points for each of the eight sample locations per bit are not shown. Analysis of the clusters can be made on individual sample points or on some type of average of the cluster values, as desired.

As mentioned above, the waveform of the electricity distribution network can have a number of different channels. These channels are defined by the pulse patterns which define a binary "1" and a binary "0". The eight zero crossings of a bit-length segment of the voltage waveform are labelled 1-8 in FIG. 5. Using these labels, one possible channel could be defined as (a) current pulses at the first four zero crossings defining a binary "1" and (b) current pulses at the last four zero crossings defining a binary "0". For purposes of illustration a different channel is used herein. That channel, arbitrarily called channel 15, is defined as follows:

binary "1"—pulses at zero crossings 1, 4, 6, and 7;
binary "0"—pulses at zero crossings 2, 3, 5, and 8.

Figure 5:
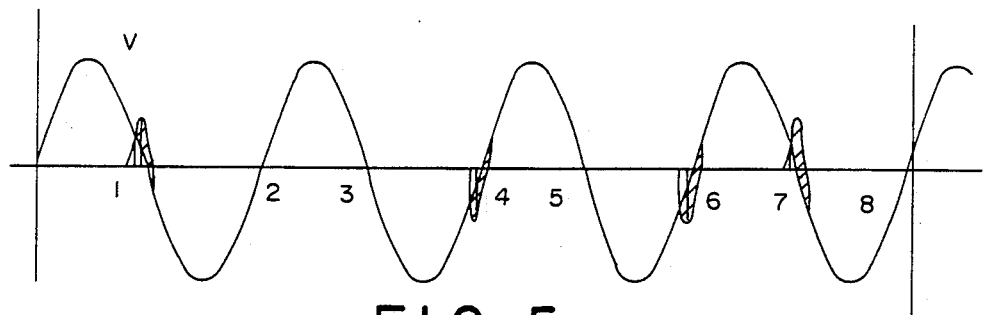
FIG. 5 is a graphical representation of a standard eight half-cycle portion of the voltage waveform of FIG. 1 showing the placement of current pulses for defining a binary "1" in a particular channel of the communication system.

FIG. 5 shows the ideal bit pattern (the bit pattern in a noise-free system) for a binary "1" in channel 15. In the sampled data illustrated in FIG. 3, therefore, the bit pattern rules for a binary "1" as applied to the clusters of sample points should be as follows:

Clusters 1 and 7 should be higher than cluster 3 and 5;
Clusters 4 and 6 should be higher (in magnitude) than clusters 2 and 8.

This is, of course, only true if the carrier (the 60 Hz current waveform of the electricity distribution network) is well-behaved. For bit "0", the complement of these cluster rules is true.

From inspection of FIG. 3, one can see that for bits number 11, 12, 13, 17, and 18 the carrier is well-behaved. However, for bits 14, 15 and 16 one cannot say that the carrier is well-behaved. The onset of carrier disturbance starts at the last half-cycle of bit number 14 and quits around the middle of bit number 16. Bit number 14 is partially destroyed, bit number 15 is totally destroyed, and bit number 16 suffers destruction, although to an extent that is difficult to assess.

Table I shows the numeric strength of sample point #6 (of the twelve sample points for each cluster) for bits 11-18 of FIG. 3, which are part of a fifty-six bit message. Note the onset of bit destruction in bit number 14, last sample. In Table I the first column is the bit number, the next eight columns are the sample values, and the last column is the result one obtains by applying the detection matrix $(+1,+1,-1,-1,-1,-1,+1,+1)$ to the samples. A negative number in this last column heretofore has resulted in the bit in question being identified as a binary "0" while a positive number in this last column has signified that the bit is a binary "1".

TABLE I

| 11 | 305 | −315 | 302 | −318 | 302 | −317 | 305 | −314 | 12 |
|----|-----|------|-----|------|-----|------|-----|------|-----|
| 12 | 306 | −315 | 303 | −316 | 303 | −318 | 307 | −314 | 12 |
| 13 | 307 | −315 | 304 | −317 | 304 | −318 | 308 | −314 | 13 |
| 14 | 308 | −315 | 305 | −318 | 305 | −317 | 309 | −388 | −61 |
| 15 | 316 | −357 | 325 | −348 | 324 | −337 | 327 | −332 | −10 |
| 16 | 326 | −331 | 322 | −334 | 314 | −324 | 316 | −319 | 14 |
| 17 | 314 | −317 | 310 | −320 | 309 | −319 | 312 | −317 | 12 |
| 18 | 313 | −316 | 309 | −319 | 309 | −319 | 312 | −316 | 13 |

Examination of FIG. 3 and Table I leads to the hope that bit number 14 and possibly bit number 16 can be corrected.

Of course, before a bad bit can be corrected it must be detected. This is done as follows:

For any of the twelve sample points "j" for channel 15, one can write the following:

| Half Cycle Number | Sampled Value | Detection Algorithm |
|---|---|---|
| 1 | $A_1 = (i_1 + ALPHA + n_1)$ | +1 |
| 2 | $A_2 = -(i_2 + n_2)$ | +1 |
| 3 | $A_3 = (i_3 + n_3)$ | −1 |
| 4 | $A_4 = -(i_4 + n_4 + ALPHA)$ | −1 |
| 5 | $A_5 = (i_5 + n_5)$ | −1 |
| 6 | $A_6 = -(i_6 + n_6 + ALPHA)$ | −1 |
| 7 | $A_7 = (i_7 - ALPHA + n_7)$ | +1 |
| 8 | $A_8 = -(i_8 + n_8)$ | +1 | where "i" indicates the carrier strength, ALPHA the signal strength, "n" is the noise strength, $A_m$ is the sampled value, and "m" is the half-cycle or zero crossing number.

$$i_1 = i_3 = i_5 = i_7 = i_p$$

$$i_2 = i_4 = i_6 = i_8 = i_n$$

$$n_1 = n_2 = n_3 = n_4 = n_5 = n_6 = n_7 = n_8 = 0$$

where $i_p$ is a constant and $i_n$ is a constant, both constants reflecting the precise location on the voltage waveform from which the sample was taken.

When the detection matrix is applied to the sampled values, the "$A_m$"s, one obtains the result:

$$R = A_1 + A_2 - A_3 - A_4 - A_5 - A_6 + A_7 + A_8$$

$A_1$, $A_3$, $A_5$ and $A_7$ are all positive and $A_2$, $A_4$, $A_6$, and $A_8$ are all negative. One can partition the "$A_m$"s into ordered sets in which one of the members of the set contains signal and the other does not. Or equivalently one can partition R into $R_1$, $R_2$, $R_3$ and $R_4$ such that:

$$R_1 = A_1 - A_3 = (i_p + ALPHA) - (i_p) = +ALPHA$$

$$R_2 = A_2 - A_4 = (-i_n) - (-i_n - ALPHA) = +ALPHA$$

$$R_3 = A_7 - A_5 = (i_p + ALPHA) - (i_p) = +ALPHA$$

$$R_4 = A_8 - A_6 = (-i_n) - (-6_6 - ALPHA) = +ALPHA$$

Applying the same partitioning to the samples when the bit is a binary "0", one obtains:

$$R_1 = -ALPHA$$

$$R_2 = -ALPHA$$

$$R_3 = -ALPHA$$

$$R_4 = -ALPHA$$

Note that in partitioning R, or the "$A_m$"s, the time interval between "$A_m$"s is minimized so that the "R"s are also ordered in time. If this is not done, it becomes impossible to accurately determine which values are obtained from stable portions of the carrier and which from unstable portions.

Thus, the sample values are partitioned into sets of differences, $R_1$, $R_2$, $R_3$, and $R_4$, where the bit signal strength is defined as $$R = R_1 + R_2 + R_3 + R_4.$$

To identify the detected bit or to detect contaminated bits, a first-level test one can apply is to test sign($R_1$), sign($R_2$), sign($R_3$), and sign($R_4$). If all the signs are positive, then bit "1" is detected. If the result of the test deviates from this structure, there is a good basis to declare the bit under consideration to be a bad bit.

But what about the possibility that a purported good pattern is actually a bad bit. In this regard, consider the original sampled value form for bit "1", namely:

$$R_1 = A_1 - A_3 = (i_1 + ALPHA + n_1) - (i_3 + n_3)$$

$$R_2 = A_2 - A_4 = -(i_2 + n_2) + (i_4 + n_4 + ALPHA)$$

$$R_3 = A_7 - A_5 = (i_7 + ALPHA + n_7) - (i_5 + n_5)$$

$$R_4 = A_8 - A_6 = -(i_8 + n_8) + (i_6 + n_6 + ALPHA)$$

Lumping together "i" and "n", viz. (i+n) = B, these equations reduce to:

$$R_1 = ALPHA + B_1 - B_3 = ALPHA + (B_1 - B_3)$$

$$R_2 = -B_2 + B_4 + ALPHA = ALPHA + (B_4 - B_2)$$

$$R_3 B_7 + ALPHA - B_5 = ALPHA + (B_7 - B_5)$$

$$R_4 = -B_8 + B_6 + ALPHA = ALPHA + (B_6 - B_8)$$

Since a misbehaving carrier can as well be described as a noisy carrier, changing $R_1$, $R_2$, $R_3$ and $R_4$ into a set of negative numbers requires the following to be true:

$$(B_1-B_3)+ALPHA_= =0$$

$$(B_4-B_2)+ALPHA_= =0$$

$$(B_7-B_5)+ALPHA_= =0$$

$$(B_6-B_8)+ALPHA_= =0$$

which can be rearranged to read:

$$B_{1=}=(-ALPHA+B_3)$$

$$B_{4=}=(-ALPHA+B_2)$$

$$B_{7=}=(-ALPHA+B_5)$$

$$B_{6=}=(-ALPHA+B_8)$$

Figure 6:
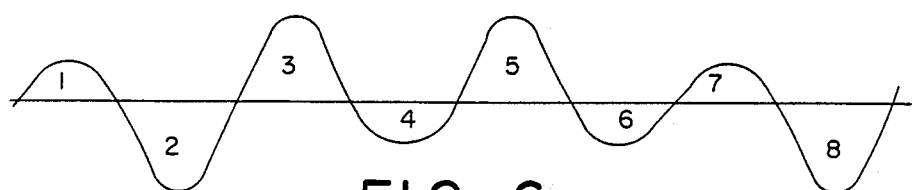
FIG. 6 is a graphical representation similar to FIG. 5 showing such extreme distortion that all signals present thereon are lost.

Graphically, such a noisy carrier can be depicted as shown in FIG. 6. Fortunately, this type of system load would be highly unusual, so the basic approach set forth above can be used to define good bits.

At a second level of testing, a restriction or preset bound can be imposed on the value of ALPHA. In those cases where the preset bound is exceeded, the corresponding value of $R_m$ is suspect since an out-of-bound value probably represents carrier instability. One way of setting such a preset bound is to compute an average. In this approach the detected results "R" for each bit can be averaged for a whole message. Since in a noise-free system the result "R" for each binary digit is the sum of four ALPHAs, one obtains:

$$R_{average}=4*ALPHA_{average}.$$

Hence, $$ALPHA_{average}=(R_{average}/4).$$

The restriction or preset bound then becomes that $R_1$, $R_2$, $R_3$, and $R_4$ should not exceed $ALPHA_{average}$ by 100%, or 200%, etc.

Of course, contamination of bits can be either destructive or favorable Consider, for example, bit #14 discussed and illustrated above, and a second bit #49. For reference, the partitioned results and final results for these bits are set forth below in Table II:

TABLE II

| Bit # | $R_1$ | $R_2$ | $R_3$ | $R_4$ | R |
|---|---|---|---|---|---|
| 14 | 4 | 4 | 3 | −67 | −56 |
| 49 | −3 | −4 | −2 | −76 | −85 |

These two bits represent the easiest situation to correct. For bit #14, $R_1$, $R_2$, and $R_3$ are well within the range of $ALPHA_{average}$ and $R_4$ is extremely negative to offset $(R_1+R_2+R_3)$ to cause R to become negative. Otherwise, $R_1$, $R_2$ and $R_3$ fit the standard pattern very well. This is a good example of destructive contamination.

Favorable bit contamination is shown by bit #49. The contaminating part $R_4$ has the same sign as $R_1$, $R_2$, $R_3$. Since the magnitude of $R_4$ is much greater than the magnitudes of $R_1$, $R_2$, or $R_3$ and since the magnitudes of $R_1$, $R_2$ and $R_3$ are well within the range of $ALPHA_{average}$, bit #49 can be appropriately corrected by the application of some majority rule applied to the signs of $R_1$, $R_2$, $R_3$ and $R_4$.

Figure 7:
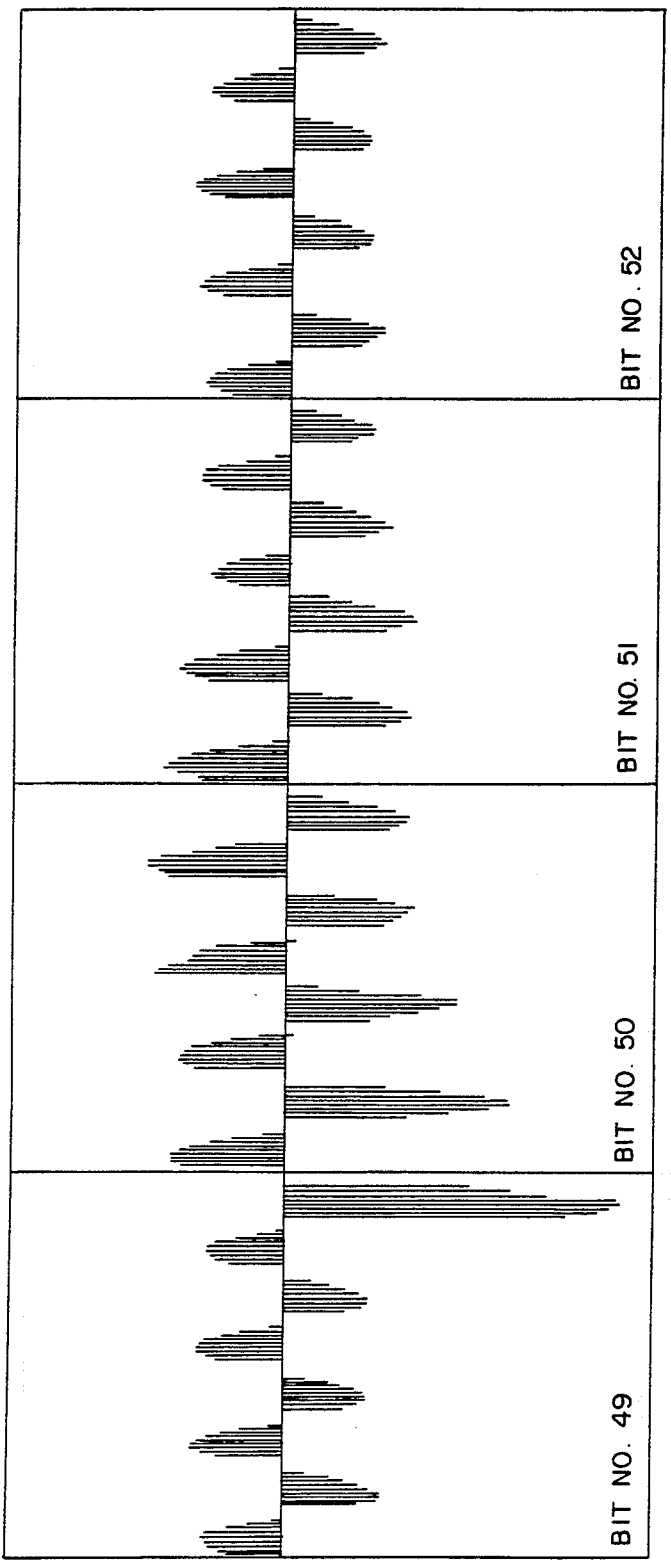
FIG. 7 is a plot representing current samples taken by the apparatus of FIG. 2, further illustrating bit contamination.

Noise contamination, as measured in the data set forth herein, happen during state changes of the electricity distribution network from one current level to another current level. Examination of FIG. 3 shows that the duration of that state change (Bits #14, #15, and #16) lasted about 1.5 its. A similar state change is illustrated in FIG. 7 for bit #49 (discussed above) through bit #51. In FIG. 7 the carrier has regained its stability by bit #52.

As discussed above, bits #14 and #49 are correctable because the onset of carrier instability affected only one of the partitioned results for each bit. This is not the case with some of the other affected bits, however. In FIG. 3, bit #15 is almost impossible to correct as is bit #50 in FIG. 7. Intermediate these two situations are bit #16 (FIG. 3) and bit #51 (FIG. 7) which are probably correctable because the carrier has stabilized somewhere in the middle of the bit. To illustrate this, consider the following set of numbers obtained from real data:

| Bit # | $R_1$ | $R_2$ | $R_3$ | $R_4$ | R |
|---|---|---|---|---|---|
| 14 | 4 | 4 | 3 | −67 | −56 |
| 15 | −9 | −14 | 4 | 6 | −13 |
| 16 | 5 | 2 | 2 | 6 | 15 |

For bit #14, apply the majority rule since $R_1=4$, $R_2=4$, and $R_3=3$ all have positive signs and $R_1$, $R_2$, and $R_3$ are close to $ALPHA_{average}$. Hence, bit #14 is a binary "1". For bit #15, however one cannot apply the majority rule. But if one looks at the combinations $R_3$, $R_4$ from bit #15 and the adjacent or successive combinations $R_1$, $R_2$ from bit 16 one finds that all four numbers are close to $ALPHA_{average}$. By inference one can say that, since it is known that bit #16 is a solid bit "1" and $R_3$ and $R_4$ are both positive, bit #15 is bit "1".

This "borrowing" principle, by looking at adjacent solid bits, helps to correct more bits. Consider another example:

| Bit # | $R_1$ | $R_2$ | $R_3$ | $R_4$ | R |
|---|---|---|---|---|---|
| 7 | −4 | −4 | −3 | −4 | −15 |
| 8 | 13 | −15 | −3 | −4 | −9 |
| 9 | 5 | 3 | 5 | 4 | 17 |

Bit #7 is a solid binary "0", bit #9 is a solid binary "1", but bit #8 is not solid. $R_1$ and $R_2$ of bit #8 are out of bounds, but $R_3$ and $R_4$ are within range. This indicates that the carrier has stabilized at the middle of bit #8 and continues to be stable at the next bit. Hence, by inference, one can conclude that bit #8 is stable and bit 8 is a binary "0".

To see how well carrier stability criteria works, consider another example:

| Bit # | $R_1$ | $R_2$ | $R_3$ | $R_4$ | R |
|---|---|---|---|---|---|
| 5 | −4 | −3 | −3 | −3 | −13 |

-continued

| Bit # | R₁ | R₂ | R₃ | R₄ | R |
|---|---|---|---|---|---|
| 6 | 3 | 4 | −24 | −7 | −24 |

With the standard decoding technique, bit #5 is correctly decoded as a binary "0" and bit #6 would be incorrectly decoded as a binary "0" as well. However, using the carrier stability criteria, since $R_3$, $R_4$ from bit #5 and $R_1$, $R_2$ from bit #6 are stable, one can infer that bit #6 is actually a binary "1".

For another example, consider bits #13 and 14:

| Bit # | R₁ | R₂ | R₃ | R₄ | R |
|---|---|---|---|---|---|
| 13 | 4 | 3 | 4 | 3 | 14 |
| 14 | 4 | 4 | 3 | −67 | −56 |

In reality, these are two contiguous binary "1"s. Placing the partial results for the two bits in sequence, one obtains:

| R₁ | R₂ | R₃ | R₄ | R₅ | R₆ | R₇ | R₈ |
|---|---|---|---|---|---|---|---|
| 4 | 3 | 4 | 3 | 4 | 4 | 3 | −67 |

Using the standard decoding technique, bit #14 would have been decoded as a binary "0". Using the "carrier stability" criteria, this bit is correctly decoded as a binary "1".

Figure 8:
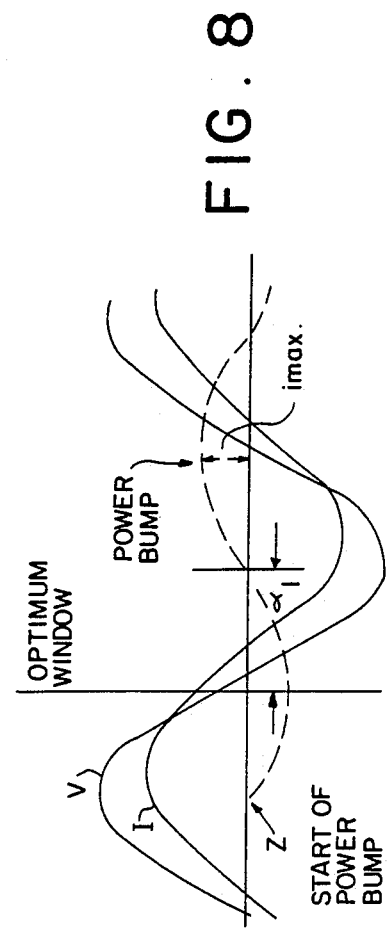
FIG. 8 is a graphical representation similar to FIG. 1 illustrating the effect of a power bump on the electricity distribution network.

Consider the magnitudes of the state changes in the electricity distribution network which are required before current signaling pulses are destroyed. Suppose, for example, that a negative power bump (load drop) occurs as shown in FIG. 8. At the optimum window, the magnitude of the power bump is $-i_{max}*\sin(ALPHA1)$. On a 27 kV system with signals injected line-to-line at 85A (peak), the magnitude sensed at the optimum window is $$(240/27000)*85 = 0.76\ Amp.$$

To obliterate this signal requires that $$i_{max}*\sin(ALPHA1) = 0.76,\ \text{or}$$

$$i_{max} = (-0.76)/\sin(ALPHA1).$$

Taking root-mean-square values, $$i_{RMS} = (-0.76)/(SQRT(2*\sin(ALPHA1)).$$

The load change is $$P = SQRT(3)* i_{RMS}*27 = 25.13/\sin(ALPHA1)kVa$$

The variation with ALPHA1 is shown by the following Table III:

TABLE III

| ALPHA (degrees) | P (kVa) |
|---|---|
| 25 | 59 |
| 20 | 73 |
| 15 | 97 |
| 10 | 144 |
| 5 | 287 |
| 1 | 1432 |

The more in-phase the load dropped is with the voltage, the larger it has to be to destroy a pulse. Unfortunately, for most loads ALPHA is in the range of ten to fifteen degrees and with a dc offset a number of pulses will be destroyed.

The method or algorithm computer 15 uses to detect and correct contaminated bits can now be summarized:

1. Establish first $ALPHA_{average}$. Use standard averaging technique.

2. Compute R(j, 1), R(j, 2), R(j, 3), R(j, 4) where j is the bit number.

$$R(j, 1) = R_1\ \text{for bit}\ j$$

$$R(j, 2) = R_2\ \text{for bit}\ j$$

$$R(j, 3) = R_3\ \text{for bit}\ j$$

$$R(j, 4) = R_4\ \text{for bit}\ j$$

3. If $ABS[R(j, k)] 2* ALPHA_{average}$, set R(j, k)=0 (where "0" is a value for R(j, k) which indicates or represents carrier instability).

4. Normalize each R(j, k) by doing the following:

$$P(j, k) = R(j, k)/ABS[R(j, k)].$$

Hence P(j, k) is either +1, −1 or zero.

5. Obtain the result R(j) by summing the four P(j, k) for that particular jth bit. If R(j)=4, then bit #j is a binary "1". If R(j)=−4, then bit #j is a binary "0". These are the solid bits.

6. If any P(j,k) is of different sign, such as

| P(j, 1) = 1 | P(j, 3) = 1 |
|---|---|
| P(j, 2) = 1 | P(j, 4) = −1 | then R(j)=2.
The reverse is true if

| P(j, 1) = +1 | P(j, 3) = −1 |
|---|---|
| P(j, 2) + −1 | P(j, 4) = −1. |

Then R(j)=−2.
If any P(j, k)=0, then R(j)=+3 or −3.

As stability criteria, require at least four stable ire that either the first three or the last three normalized results all have the same sign and an absolute value of 1.

7. Suppose bit j does not meet the criteria laid down in steps 5 and 6:

Check bit (j-1).
If this bit is solid, apply the following:

$$[P(j-1, 3) + P(j-1, 4) + P(j,1) + P(j, 2)].$$

If the result is +4, then bit j is "1".
If the result is −4, then bit j is "0".

If the result is "0", then check bit (j-1).

If bit (j-1) is "1", then bit j is "0".

If bit (j-1) is "0", then bit j is "1".

Similar tests can be applied with bit (j+1) if the last two normalized partial results, P(j, 3) and P(j, 4), look solid. This correction criteria can only be applied if the following is true for bit #j:

ABS[P(j, 1)+P(j, 2)]=2, hence use bit #(j−1) for correction.

B. ABS[P(j, 3)+P(j, 4)]=2, hence use bit #(j+1) for correction.

8. Anything not meeting the requirements of steps 5, 6, or 7 are declared uncorrectable.

Typical examples of uncorrectable bits are shown below:

| P(j, 1) | P(j, 2) | P(j, 3) | P(j, 4) |
|---|---|---|---|
| −1 | 0 | −1 | 0 |
| −1 | 1 | 1 | −1 |
| −1 | 0 | 0 | 0 |
| 0 | 0 | −1 | 0 |

In none of these cases is there the possibility of four partial results which meet the carrier stability criteria. Nor do at least two successive results in the bit under question make up the series of four stable partial results. For example, the first bit has no two successive partial results which are within bounds. The second bit has two successive "1" partial results, but these are not adjacent the ends of the bit so that they could make up a series of four stable partial results. The third and fourth bits clearly lack enough carrier stability indicating partial results to meet the requirements of two successive stable results in the bit in question.

Another typical example of uncorrectable bits is when an adjacent bit is not solid enough to apply the bit stability criteria. Consider the following:

| Bit # | P(j, 1) | P(j, 2) | P(j, 3) | P(j, 4) |
|---|---|---|---|---|
| 31 | −1 | −1 | −1 | −1 |
| 32 | −1 | −1 | −1 | 0 |
| 33 | 0 | 0 | −1 | −1 |
| 34 | 0 | −1 | 1 | 1 |
| 35 | −1 | −1 | −1 | −1 |

Bit #32 can be corrected in conjunction with bit #31. Bit #34 can be corrected in conjunction with bit #35. But bit #33 cannot be corrected since no adjacent bits can provide any help.

From the above it can be seen that the "carrier stability" algorithm detects error bits and corrects certain contaminated bits. Multibit messages increase the capability of the "carrier stability" algorithm. After correction of such contaminated bits as disclosed above, a parity-check based technique, such as Wagner's "erasure filling", can be applied to the uncorrectable bits.

In view of the above it will be seen that the various objects and features of the present invention are achieved and other advantageous results are attained.

As various changes could be made in the above methods without departing from the scope of the invention, it is intended that all matter contained in the above description and shown in the accompanying drawings shall be interpreted as illustrative and not in a limiting sense.

What is claimed is:

1. In a communication system using the current waveform of an electricity distribution network as a carrier, a signal being present as composite binary digits, each composite binary digit being defined by a pulse pattern at preselected positions on the voltage waveform, the pulses being spaced along the waveform so that they are ordered in time, the pulse pattern for a binary "1" being complementary to the pulse pattern for a binary "0", a system for identifying said binary digits comprising:

sampling the current waveform at the preselected positions to obtain an ordered set of waveform values, the magnitudes of the values corresponding to a binary digit pulse pattern being larger, in a noise-free system, when the binary digit corresponding to that pulse pattern is present than when it is absent;

examining the ordered waveform values for each bit to determine if the values fall within preset criteria indicative of a stable carrier;

when the ordered waveform values for a particular bit all fall within the preset criteria, identifying that particular bit as having the binary value corresponding to its sampled pulse pattern;

when at least some of the ordered waveform values for a particular bit fall outside the preset criteria, labelling that particular bit as suspect;

for each suspect bit, testing the ordered values of that bit and of adjacent bits to determine whether a series of a first predetermined number of successive values meets the preset stability criteria, said series including at least a second predetermined number of successive values from the suspect bit and at least the second predetermined number of successive values from an adjacent bit; and identifying the binary value, if any, of the suspect bit based upon said second predetermined number of successive values from the suspect bit when the test of the testing step is met, otherwise labelling the suspect bit as uncorrectable.

2. The system as set forth in claim 1 wherein the step of examining the ordered waveform values to determine if the values fall within preset carrier stability criteria includes the step of partitioning the waveform values for each bit into a predetermined number of sets, said predetermined number corresponding to the number of pulses in a pulse pattern representing a binary digit.

3. The system as set forth in claim 2 wherein only one value of each set potentially reflects the presence of a current pulse and another value of said set contains no signal information.

4. The system as set forth in claim 3 wherein said one value and said another value from the same set are obtained in the sampling step from the same relative phase position along the voltage waveform but from different cycles of said waveform.

5. The system as set forth in claim 4 wherein for each set the time interval between the sampling of said one value and said another value is a minimum.

6. The system as set forth in claim 2 wherein the step of examining the ordered waveform values to determine if the values fall within preset carrier stability criteria includes the step of performing an arithmetic operation on the values of each set to obtain a comparative value for that set.

7. The system as set forth in claim 6 wherein each comparative value has a sign associated therewith, and wherein the arithmetic operation is such that the sign of the comparative value in a noise-free system is positive when one binary digit is present and is negative when the complement of said one binary digit is present.

8. The system as set forth in claim 7 wherein the preset criteria of a stable carrier include a requirement that all the signs of the comparative values for a given bit be the same.

9. The system as set forth in claim 8 wherein the step of examining the ordered waveform values to determine if the values fall within preset carrier stability criteria includes the step of testing the magnitudes of all the comparative values for a particular bit to determine if any comparative value exceeds a preset bound.

10. The system as set forth in claim 9 wherein any bit having a comparative value for one of its sets which exceeds the preset bound is labelled a suspect bit.

11. The system as set forth in claim 9 wherein a bit is labelled a good bit when all the signs of its associated comparative values are the same and none of the magnitudes of the comparative values exceeds the preset bound.

12. The system as set forth in claim 6 wherein the step of examining the ordered waveform values to determine if the values fall within preset carrier stability criteria includes the step of testing the magnitudes of all the comparative values for a particular bit to determine if any comparative value exceeds a preset bound.

13. The system as set forth in claim 12 wherein a comparative value exceeding the preset bound is replaced by a fixed value representative of carrier instability.

14. The system as set forth in claim 13 wherein comparative values not exceeding the preset bound are normalized.

15. The system as set forth in claim 1 wherein each composite binary digit is defined by at least four pulses on the voltage waveform, and wherein at least four successive pulses must satisfy preset carrier stability criteria for a bit associated therewith to be identified.

16. The system as set forth in claim 1 wherein the bits are transmitted in groups with each group including at least one parity bit, further including the step of making bit-quality determinations on each bit.

17. The system as set forth in claim 16 further including the step of performing a parity check on the group of bits and accepting the group of bits only if the parity check is satisfied.

18. The system as set forth in claim 17 wherein when the parity check is not satisfied the bit with the poorest bit-quality determination is changed to its complement.

19. The system as set forth in claim 1 in which the preset carrier stability criteria includes a bound on the magnitude of current waveform samples, said bound being determined in part by averaging the values of previous current waveform samples.

20. The system as set forth in claim 19 in which the bound on the magnitude of current waveform samples is a multiple of the average of previous waveform samples.

* * * * *

UNITED STATES PATENT AND TRADEMARK OFFICE
CERTIFICATE OF CORRECTION

PATENT NO. : 4,996,513  
DATED : February 26, 1991  
INVENTOR(S) : Mak et al.

Page 1 of 2

It is certified that error appears in the above—identified patent and that said Letters Patent is hereby corrected as shown below:

Column 1, line 55 is "1is" should be --- "1" is ---.

Column 1, line 57 is "1s" should be --- "1"s ---.

Column 5, second table, #7, under "Sampled Value" is "$A_7 = (i_7 - ALPHA + n_7)$ should be --- $A_7 = (i_7 + ALPHA + n_7)$ ---.

Column 5, line 65 is "$R_4 = A_8 - A_6 = (-i_n) - (-6_6 - ALPHA = +ALPHA$" should be --- $R_4 = A_8 - A_6 = (-i_n) - (-i_6 - ALPHA) = + ALPHA$.

Column 6, line 25 is "Am"s is minimized" should be --- "Am"s of a set is minimized" ---.

Column 6, line 64 is "$R_3B_7 + ALPHA - B_5 = ALPHA + (B_7 - B_5)$" should be --- $R_3 = B_7 + ALPHA - B_5 = ALPHA + (B_7 - B_5)$.

UNITED STATES PATENT AND TRADEMARK OFFICE
CERTIFICATE OF CORRECTION

PATENT NO. : 4,996,513

DATED : February 26, 1991

INVENTOR(S) : Sioe T. Mak

It is certified that error appears in the above-identified patent and that said Letters Patent is hereby corrected as shown below:

Column 8, line 15 "A" from line 14 should be moved down to line 15 so it reads --- A similar ---.

Column 9, line 45 is "$i_{MAX}$*" should be --- $-i_{MAX}$* ---.

Column 10, line 23 is "(j, k)]2" should be --- (j, k)]¢2 ---.

Column 10, line 50 is "stable ire" should be --- stable continuous extracted pulses. For slightly contaminated bits require ---.

Column 10, line 51 is "normalize results" should be --- normalize partial results ---.

Signed and Sealed this

Tenth Day of November, 1992

Attest:

DOUGLAS B. COMER

*Attesting Officer*          *Acting Commissioner of Patents and Trademarks*

UNITED STATES PATENT AND TRADEMARK OFFICE
CERTIFICATE OF CORRECTION

PATENT NO. : 4,996,513

DATED : February 26, 1991

INVENTOR(S) : Mak et al.

It is certified that error appears in the above—identified patent and that said Letters Patent is hereby corrected as shown below:

Column 1, line 55 is "lis" should be --- "1" is ---.

Column 1, line 57 is "1s" should be --- "1"s ---.

Column 5, second table, #7, under "Sampled Value" is "$A_7 = (i_7 - ALPHA + n_7)$" should be --- $A_7 = (i_7 + ALPHA + n_7)$ ---.

Column 5, line 65 is "$R_4 = A_8 - A_6 = (-i_n) - (-6_6 - ALPHA = +ALPHA$" should be --- $R_4 = A_8 - A_6 = (i_n) - (-i_6 - ALPHA) = + ALPHA$.

Column 6, line 25 is "Am"s is minimized" should be --- "Am"s of a set is minimized" ---.

Column 6, line 64 is "$R_3B_7 + ALPHA - B_5 = ALPHA + (B_7 - B_5)$" should be --- $R_3 = B_7 + ALPHA - B_5 = ALPHA + (B_7 - B_5)$.

Column 8, line 14 is "about 1.5its." should be --- about 1.5 bits.---.

Column 8, line 15 "A" from line 14 should be moved down to line 15 so it reads --- A similar ---.

Column 9, line 45 is "$i_{MAX}*$" should be --- $-i_{MAX}*$ ---.

Column 10, line 23 is "$(j, k)]2$" should be --- $(j, k)]¢2$ ---.

Column 10, line 50 is "stable ire" should be --- stable continuous extracted pulses. For slightly contaminated bits require ---.

UNITED STATES PATENT AND TRADEMARK OFFICE
CERTIFICATE OF CORRECTION

PATENT NO. : 4,996,513

DATED : February 26, 1991

INVENTOR(S) : Mak, et. al.

It is certified that error appears in the above-identified patent and that said Letters Patent is hereby corrected as shown below:

Column 10, line 51 is "normalize results" should be --- normalize partial results ---.

This certificate supersedes Certificate of Correction issued November 10, 1992.

Signed and Sealed this

Thirtieth Day of March, 1993

*Attest:*

STEPHEN G. KUNIN

*Attesting Officer*   Acting Commissioner of Patents and Trademarks